United States Patent
Huebner et al.

(10) Patent No.: US 8,428,538 B2
(45) Date of Patent: Apr. 23, 2013

(54) CHANNEL ESTIMATOR

(75) Inventors: Axel Huebner, Munich (DE); Reinhard Rueckriem, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 970 days.

(21) Appl. No.: 12/170,149

(22) Filed: Jul. 9, 2008

(65) Prior Publication Data

US 2010/0009649 A1    Jan. 14, 2010

(51) Int. Cl.
*H04B 1/06*    (2006.01)
*H04B 7/00*    (2006.01)

(52) U.S. Cl.
USPC ........... 455/277.2; 455/226.1; 455/67.11; 455/63.1; 455/340

(58) Field of Classification Search ...... 455/67.11–67.7, 455/132–141, 150.1–200.1, 226.1–226.4, 455/232.1–254, 275, 277.1–312, 338–340; 375/316–352

See application file for complete search history.

(56) References Cited

U.S. PATENT DOCUMENTS

| | | | |
|---|---|---|---|
| 6,952,394 B1 * | 10/2005 | Kim et al. ................ | 370/208 |
| 7,142,888 B2 * | 11/2006 | Okawa et al. ............. | 455/561 |
| 7,457,366 B2 * | 11/2008 | Maltsev et al. ........... | 375/260 |
| 2002/0181549 A1 * | 12/2002 | Linnartz et al. ........... | 375/142 |
| 2003/0231721 A1 * | 12/2003 | Rouphael et al. .......... | 375/341 |
| 2004/0198296 A1 * | 10/2004 | Hui et al. .................. | 455/296 |
| 2007/0009016 A1 * | 1/2007 | Tsutsui ..................... | 375/219 |
| 2007/0115801 A1 | 5/2007 | Li et al. | |
| 2007/0165735 A1 * | 7/2007 | Pan et al. .................. | 375/267 |
| 2007/0230635 A1 * | 10/2007 | Wilhelmsson et al. ..... | 375/345 |
| 2008/0049814 A1 * | 2/2008 | Jeon ......................... | 375/147 |
| 2008/0051149 A1 | 2/2008 | Mehta et al. | |
| 2008/0063079 A1 * | 3/2008 | Zhongjun et al. ......... | 375/240.21 |
| 2008/0108310 A1 | 5/2008 | Tong et al. | |
| 2008/0139213 A1 * | 6/2008 | Coersmeier ............... | 455/450 |
| 2008/0152043 A1 * | 6/2008 | Eun et al. .................. | 375/340 |
| 2008/0240265 A1 * | 10/2008 | Fechtel ..................... | 375/260 |
| 2009/0129498 A1 * | 5/2009 | Nakamura et al. ........ | 375/267 |
| 2010/0067629 A1 * | 3/2010 | Gaddam et al. ........... | 375/346 |
| 2010/0158176 A1 * | 6/2010 | Luo et al. .................. | 375/350 |

OTHER PUBLICATIONS

"Data Transmission by Frequency-Division Multiplexing Using the Discrete fourier Transform", S.B. Weinstein and Paul M. Ebert, IEEE Transactions on Communication Technology, vol. Com-19, No. 5, Oct. 1971, pp. 628-634.

"Two-Dimensional Pilot-Symbol-Aided Channel Estimation by Wiener Filtering", Peter Hoeher, Stefan Kaiser and Patrick Robertson, IEEE, 1997, pp. 1845-1848.

"Receive Antenna Selection for MIMO Flat-Fading Channels: Theory and Algorithms", Alexei Gorokhov and Arogyaswami Paulraj, IEEE Transactions on Information Theory, vol. 49, No. 10, Oct. 2003, pp. 2687-2696.

(Continued)

*Primary Examiner* — Edward Urban
*Assistant Examiner* — Rui Hu
(74) *Attorney, Agent, or Firm* — Eschweiler & Associates, LLC

(57) ABSTRACT

A radio receiver comprises a processing unit configured to subject a received radio signal to signal switching. A control unit is configured to output a control signal indicative of information related to the signal switching. A channel estimator is coupled to an output of the processing unit and configured to provide channel parameters based on the control signal received from the control unit.

25 Claims, 7 Drawing Sheets

OTHER PUBLICATIONS

Chapter 5: "Fundamentals of Diversity Systems", W.C. Jakes, Y.S. Yeh, M.J. Gans and D.O. Reudink, from the book entitled *Microwave Mobile Communications*, Edited by William C. Jakes IEEE Press, 2$^{nd}$ Edition, 1994, ISBN 0-7803-1069-1, 17 pgs.

"SDARS-Antenna-Diversity-Schemes for a better Radio-Link in Vehicles", Heinz K. Lindenmeier, Leopold M. Reiter, Jochen F. Hopf, Stefan M. Lindenmeier, Heinrich-G. Schuering and Gerd-H. Hassmann, SAE International, 2005, 7 pgs.

* cited by examiner

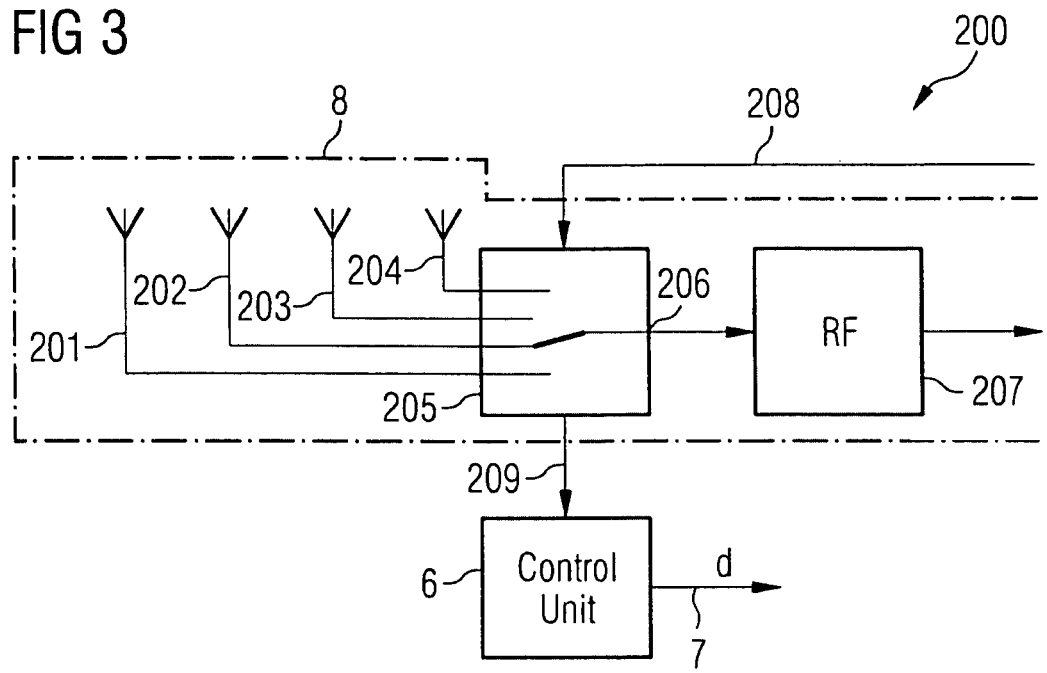
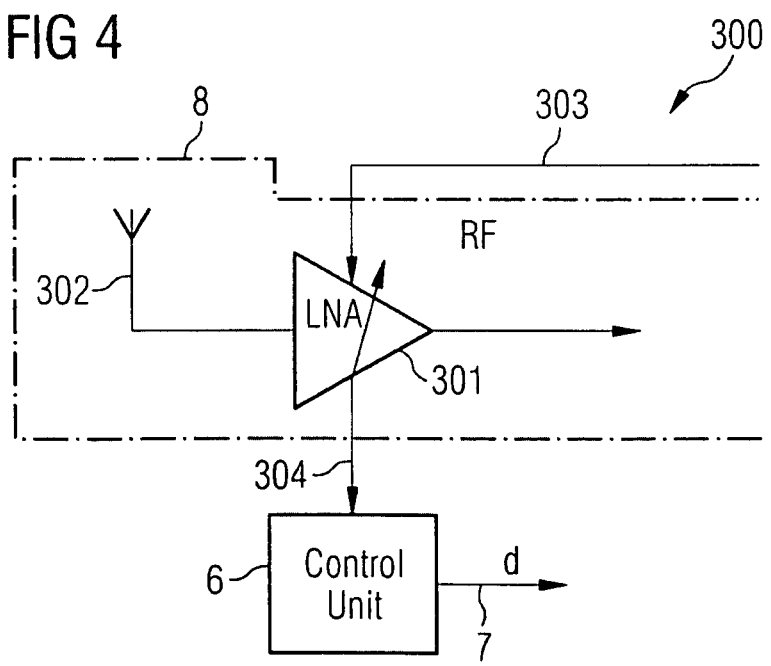

CHANNEL ESTIMATOR

FIELD OF THE INVENTION

The invention relates to techniques of channel estimation in radio communications systems, and more particularly to channel estimation in radio communications systems in which the received signal is subjected to signal switching.

BACKGROUND OF THE INVENTION

Signal switching may be used in a receiver for a variety of purposes. It is desirable to provide for a high receiver performance in the presence of signal switching.

BRIEF DESCRIPTION OF THE DRAWINGS

Aspects of the invention are made more evident by way of example in the following detailed description of embodiments when read in conjunction with the attached drawing figures, wherein:

FIG. 3 is a schematic block diagram of a first embodiment of an input unit of a radio receiver;

FIG. 4 is a schematic block diagram of a second embodiment of an input unit of a radio receiver;

DETAILED DESCRIPTION OF THE INVENTION

In the following description and claims, the terms "coupled" and "connected", along with derivatives may be used. It should be understood that these terms may be used to indicate that two elements co-operate or interact with each other regardless whether they are in direct physical or electrical contact, or they are not in direct contact with each other.

Furthermore, it should be understood that embodiments of the invention may be implemented in discrete circuits, partially integrated circuits or fully integrated circuits.

By way of example, some parts of the following description relate to multi-carrier modulation systems such as e.g. an orthogonal frequency division multiplexing (OFDM) radio communications system. The expression OFDM is not intended to be limited to a specific standard or application but should be understood broadly to comprise virtually all multi-carrier modulation systems. In particular, radio systems employing multiple transmit and/or receive antennas known as multiple input/multiple output (MIMO) systems can use multi-carrier modulation techniques such as OFDM and may form part of embodiments described herein.

OFDM systems as described herein may be used in terrestrial/hand-held digital video broadcasting (DVB-T/H). DVB-T/H is based on terrestrial transmitters and a communications system design adapted for mobile receivers. However, also other OFDM systems as, for instance, satellite OFDM systems may take benefit from the concepts and principles outlined herein.

Figure 1:
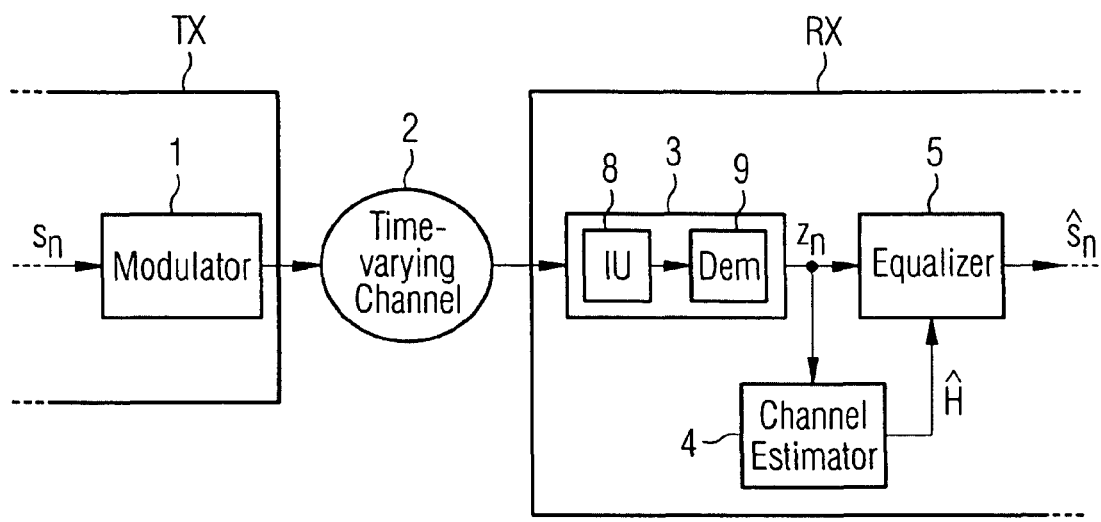
FIG. 1 is a schematic block diagram of a radio communications system.

FIG. 1 illustrates the basic building blocks of a radio communications system. In a transmitter TX, information data symbols $s_n$ are modulated on a carrier signal. n denotes the time instant, e.g. the symbol time index. As it is evident for a person skilled in the art, upstream data processing techniques such as, for example, source encoding, symbol interleaving, channel encoding etc. may be applied though are not depicted in FIG. 1.

The consecutive symbols $s_n$ are transmitted through a generally time-variant, frequency-selective and noisy channel 2. The Channel Transfer Function (CTF) may be described by channel parameters denoted by H.

Figure 5:
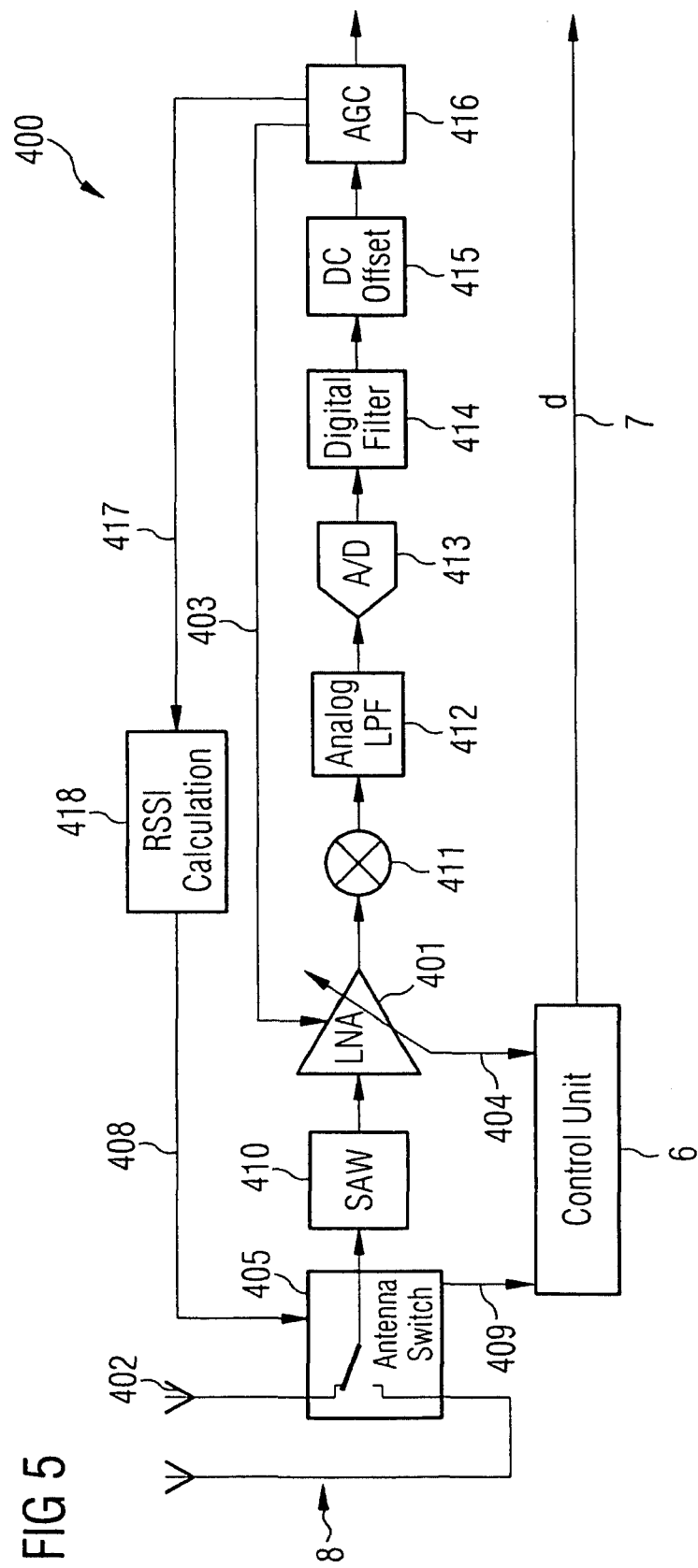
FIG. 5 is a schematic block diagram of a third embodiment of an input unit of a radio receiver.

The receiver RX comprises a processing unit 3, a channel estimator 4 and an equalizer 5. The processing unit 3 may comprise an input unit 8 and a demodulator 9. Not shown in FIG. 1, the input unit 8 may comprise an antenna (or multiple antennas), a radio frequency (RF) part and a down-conversion unit configured to down-convert the received signal to an Intermediate Frequency (IF) or the baseband. After further IF or baseband signal processing such as e.g. sampling, analog-to-digital conversion, filtering and so forth (an exemplary, more detailed configuration of the input unit 8 is illustrated in FIG. 5), the signal generated by the input unit 8 is demodulated in demodulator 9 to obtain a sequence of samples $z_n$. The demodulator 9 may be generally of any type, such as e.g. a CDMA (Code Division Multiple Access) signal demodulator or an OFDM demodulator. The samples $z_n$ are fed to the input of the channel estimator 4 and to the input of the equalizer 5. Known symbols termed pilots among these samples $z_n$ may be used to calculate estimated channel parameters $\hat{H}$. As will be described further below in more detail, a filter is used to calculate the channel parameters $\hat{H}$ from samples $z_n$. Channel estimation may be accomplished using a variety of techniques, amongst them pilot-based channel estimation, pilot-assisted channel estimation, decision feedback channel estimation and combinations of these techniques.

The channel estimates (channel parameters) $\hat{H}$ are fed to the equalizer 5. In equalizer 5, the influence of the transmission channel on the transmitted data is yielding the estimated sequence of samples $s_n$ recovered in the receiver RX. This sequence is denoted by $\hat{s}=(\hat{s}_n)$.

The sequence $\hat{s}$ of equalized data symbols is then de-mapped, i.e. so-called soft-bits are generated from the signal constellation points. These soft-bits are fed to further data processing circuitry such as e.g. a channel decoder for further processing. Data processing units used for these and other tasks are not depicted in FIG. 1 for the sake of brevity.

Signal switching processes in the data processing path upstream of the equalizer 5 (i.e. in the processing unit 3) typically introduce discontinuities to the CTF seen by the following blocks of the signal processing chain, such as the channel estimator 4 and the equalizer 5. Such discontinuities may significantly impair the performance of the channel estimator 4 and consequently the performance of the equalizer 5.

Figure 2:
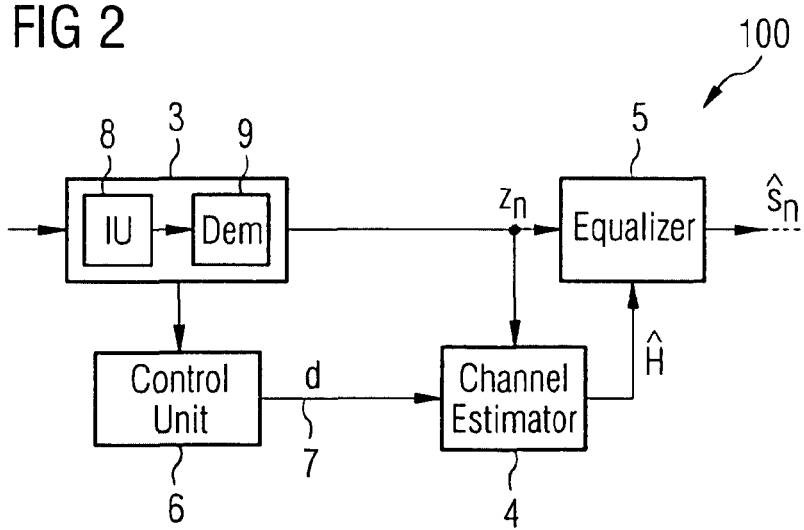
FIG. 2 is a schematic block diagram of an embodiment of a radio receiver.

FIG. 2 shows a basic block diagram of a receiver 100 according to a first embodiment of the invention. Here and throughout the following description, the same reference signs relate to the same or functionally similar parts of the circuitry. In view of blocks 3, 4, 5, 8, 9, the first embodiment may correspond to the receiver RX described in conjunction with FIG. 1. Further, the processing unit 3 is connected to a control unit 6, which outputs a control signal 7 denoted by d. The control signal 7 is fed to the channel estimator 4.

The control signal 7 is indicative of information related to signal switching in the processing unit 3, i.e. in the signal path upstream of the equalizer 5 and channel estimator 4. Signal switching in the processing unit 3 generally introduces discontinuities (or, more specifically, transitions from one discontinuity level to another discontinuity level) in the demodulated signal, i.e. the sequence of samples $z_n$. Owing to the information related to the signal switching contained in the control signal 7, the channel estimator 4 may adapt the computation scheme for calculating the channel parameters $\hat{H}$ to consider different discontinuity levels introduced by the signal switching in the processing unit 3. More specifically, to each sample $z_n$ used for channel estimation, the information related to signal switching contained in control signal 7 may be indicative of the current discontinuity level associated to this sample $z_n$ and/or may be indicative of a history of discontinuity levels before, after or around the time instant n. Thus, the computation scheme for calculating the channel parameters $\hat{H}$ applied in the channel estimator 4 is varied in response to the signal switching information contained in control signal 7. This additional signal switching information may allow the channel estimator 4 to take into account to which discontinuity level a specific sample $z_n$ relates, thus avoiding "blind" averaging or interpolation procedures running over samples $z_n$ pertaining to different discontinuity levels.

In other words, without information related to signal switching, the channel estimator 4 would try to resolve signal level discontinuities by averaging over them. Depending on the type and number of discontinuities, the result of the channel estimation could strongly differ from the real CTF, in fact both before and after the occurrence of a signal level discontinuity (due to averaging or interpolation procedures performed in the channel estimator 4). Such deviations of the estimated CTF (i.e. the estimated channel parameters) would in turn lead to a loss in Signal-to-Noise Ratio (SNR) and thus to a performance degradation of the receiver. This may be avoided by the switching dependent channel estimation technique described herein.

Figure 14:
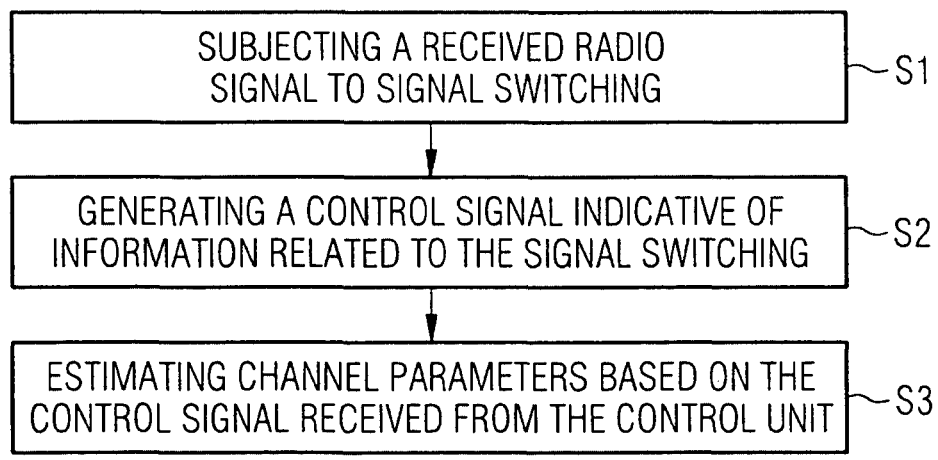
FIG. 14 is a flowchart illustrating a method of channel estimation in a radio communications system.

Thus, as illustrated in FIG. 14, is one example of a method for channel estimation in a radio communications system that comprises subjecting the received radio signal to signal switching (step S1). According to step S2, the control signal 7 indicative of information related to the signal switching is generated. At S3, the channel parameters are estimated based on the control signal 7 received from the control unit 6.

It is to be noted that the control unit 6 may also be part of the processing unit 3. In this case, the control signal 7 is directly output by the processing unit 3.

FIG. 3 illustrates a first embodiment of a circuitry 200 comprised in the input unit 8. The circuitry 200 comprises a plurality (in one example four) of antennas 201, 202, 203, 204. Outputs of the antennas 201, 202, 203, 204 are connected to an antenna switch 205. The antenna switch 205 may be a selector switch configured to selectively connect one or more of the antenna outputs to an output 206 of the antenna switch 205. This output 206 is connected to a radio frequency (RF) circuitry 207. The RF circuitry 207 may comprise a channel filter, a Low Noise Amplifier (LNA), a mixer for down-conversion of the received signal to an Intermediate Frequency (IF) or to baseband etc. By way of example, reference is made to FIG. 5 in which an RF circuitry 207 is exemplified in more detail.

The antenna switch 205 is operated in response to a switching signal 208, which may be derived by monitoring and comparing the signal strength associated with each antenna output. A position of the antenna switch 205 (i.e. an index number 1, 2, 3, 4 of the selected antenna) is output via switch position signal 209 to the control unit 6. The control unit 6 generates the control signal 7 from the switch position signal 209. The control signal 7 may e.g. be updated each time instant n or whenever the position of the antenna switch 205 changes.

In one embodiment, the switch position signal 209 may be binary encoded to form the control signal 7. The circuitry 200 may contain $N_{ant}$ antennas switching that are synchronized to the symbol rate (it is to be noted that $N_{ant}$ may be identical to the number of antennas or, if antenna switching comprises antenna combining, may be different from the number of antennas). The control signal 7 may be formed by the binary encoded index number of the antenna switching position that has been chosen to receive the current symbol (the numbering itself is arbitrary but may not change). The control signal 7 may comprise bit words d of $N_{CS}$ bits $(d_1, \ldots, d_{N_{CS}})$ with $$N_{CS} = \lceil \log_2(N_{ant}) \rceil, \quad (1)$$

where $\lceil x \rceil$ denotes the nearest integer to x not smaller than x and $\log_2(x)$ denotes the dual logarithm of x. Hence, for a four antennas switching system, a control signal 7 of a two bit word $d=(d_1, d_2)$ would be sufficient.

Figure 6:
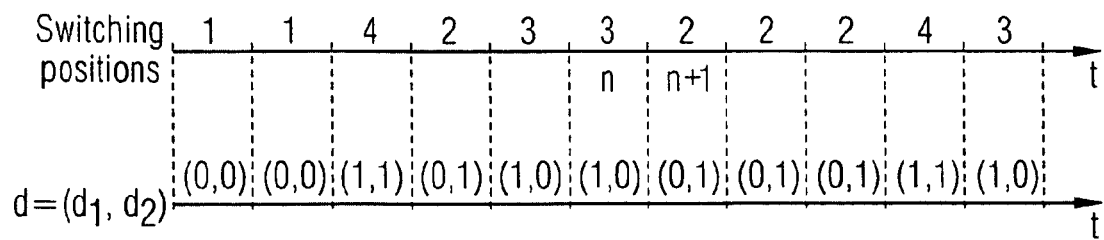
FIG. 6 is a diagram illustrating the function of a first embodiment of a control unit of a radio receiver.

The function of the control unit 6 is illustrated in FIG. 6. The switching positions causing corresponding signal discontinuity levels in the switched received radio signal of samples $z_n$ are expressed by numbers 1, 2, 3, 4 and plotted in time direction. The control signal 7 is coded by two bits $(d_1, d_2)$. For instance, at t=n, d=(1, 0) and at t=n+1, d=(0, 1).

Figure 11:
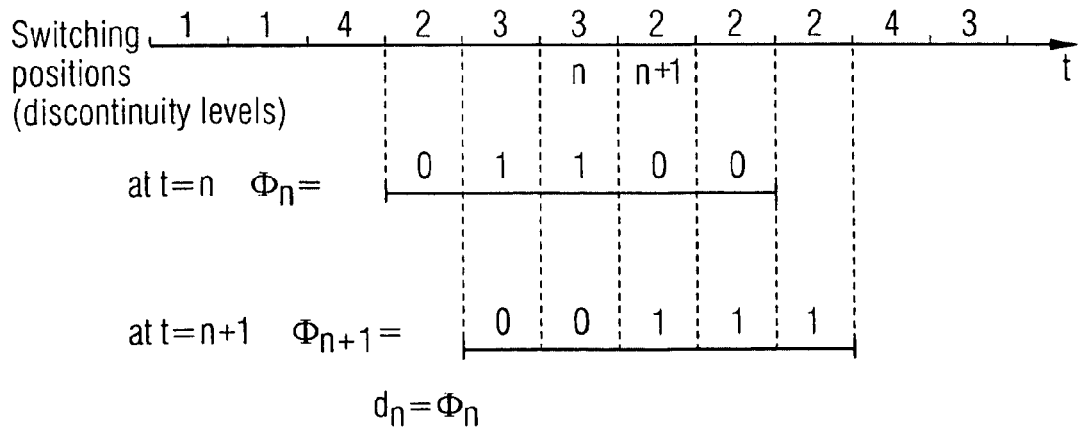
FIG. 11 is a diagram illustrating the function of a second embodiment of a control unit of a radio receiver.

FIG. 11 illustrates another algorithm to generate the control signal 7. Again, the switching positions $p_n \in \{1, 2, 3, 4\}$ are indicated on the time scale. Let $\phi_n$ be a vector of size 2W+1 that contains the history of the switching positions or, more generally spoken, the signal discontinuity levels, where the time instant of the middle element of the vector $\phi_n$ is n, i.e. $\phi_n = (p_{n-W}, p_{n-W+1}, \ldots, p_n, \ldots, p_{n+W-1}, p_{n+W})$. By way of example, if W=2, $\phi_n = (2, 3, 3, 2, 2)$ at time t=n and $\phi_{n+1} = (3, 3, 2, 2, 2)$ at time t=n+1. This vector $\phi_n$ is converted into a binary vector $\phi_n$ of the same length by setting the n'-th element to 1 if $p_{n'}=p_n$ and to 0 otherwise, where $n-W \leq n' \leq n+W$. Hence, the middle element of $\phi_n$ is 1 by definition, since n=n' holds in this case, and all other non-zero elements describe time instants in the history that feature the same switching position (or signal discontinuity level) as $p_n$. Referring to the above example, $\phi_n = (0, 1, 1, 0, 0)$ at t=n, and $\phi_{n+1} = (0, 0, 1, 1, 1)$ at t=n+1. Then, the binary vector $\phi_n$ can directly be used as control signal 7 which is updated every time instant, i.e. $d_n = \phi_n$. Further, as the middle element of the binary vector $\phi_n$ is always 1, the middle element may be excluded from binary vector $\phi_n$.

FIG. 4 illustrates a circuitry 300 which may be comprised in the input unit 8 according to a second embodiment of a radio receiver RX. The input unit 8 comprises a low noise amplifier (LNA) 301, the input of which is coupled to an antenna 302. The LNA 301 is a switchable gain amplifier. Such amplifiers are typically formed by a chain of switchable gain stages, wherein each stage can be selectively enabled or disabled. Gain switching is accomplished in response to a gain switch signal 303, which may be generated on the basis of a signal strength measurement in the receiver RX. A gain level signal 304 is used to report the current gain level to the control unit 6. The control unit 6 generates the control signal 7 indicative of information related to the signal switching caused by gain level switching. The control signal 7 may indicate only the current gain level at the considered time instant n or may indicate a history of gain level switchings occurred before, after or around the considered time instant. In particular, the control signal 7 of value d may be generated the same way as explained above in conjunction with FIGS. 6 and 11.

FIG. 5 illustrates in more detail another circuitry 400 which may be comprised in the input unit 8 according to a third embodiment. The circuitry 400 shown in FIG. 5 combines the concepts of antenna switching (i.e. antenna diversity) and amplification gain switching as already explained above in conjunction with the embodiments shown in FIGS. 3 and 4. Further, it is to be noted that still other switchable units may be provided in the signal path of the circuitry 400. In this case, such other switchable units are also coupled to the control unit 6 in order to make information about signal switching in these units available to the channel estimator 4 via control signal 7.

Briefly, a plurality of antennas 402 (corresponding to antennas 201 to 204) is coupled to an antenna switch 405 (corresponding to antenna switch 205). An output of the antenna switch 405 is coupled to a channel filter 410 such as, for example, a SAW (Surface Acoustic Wave) filter. The circuitry 400 may further comprise a low noise amplifier (LNA) 401, a mixer or down-conversion stage 411, an analog baseband lowpass filter 412, an analog-to-digital converter 413, a digital filter 414, a DC offset correction stage 415 and an Automatic Gain Control (AGC) 416. The AGC 416 controls the gain of the circuitry 400. To this end, an output of the AGC 416 is coupled via signal 403 (corresponds to signal 303 in FIG. 4) to the LNA 401, and another output of the AGC is coupled via signal 417 to an RSSI (Received Signal Strength Indication) unit 418. The RSSI unit 418 calculates for each antenna 402 a signal strength indication. To this end, the antenna switch 405 is adapted to periodically switch through the antennas 402, and the RSSI unit 418 monitors the signal strength associated with each antenna 402. Then, a decision is made which of the antennas 402 provides for maximum signal strength, and this decision is coupled as antenna select signal 408 (corresponding to antenna select signal 208) to the antenna switch 405. Monitoring of the signal strength associated with different antennas 402 may be performed in an acquisition period or e.g. periodically during a guard time where no user data has to be processed. Especially in OFDM systems, the guard time $T_g$ between successive OFDM symbols is available for signal strength monitoring of different antennas. It is to be understood that signal switching both in the switching unit 405 and in the LNA 401 is synchronized to the symbol timing.

As illustrated in FIG. 5, the signal switching events and signal switching positions are reported via switch position signal 409 (corresponding to switch position signal 209) and gain switch signal 404 (corresponding to gain switch signal 304) to the control unit 6. Both switch signals 409, 404 can be combined for the generation of the control signal 7 which is then indicative of all discontinuity levels of the received radio signal caused by antenna switching and amplifier gain switching in combination.

Figure 7:
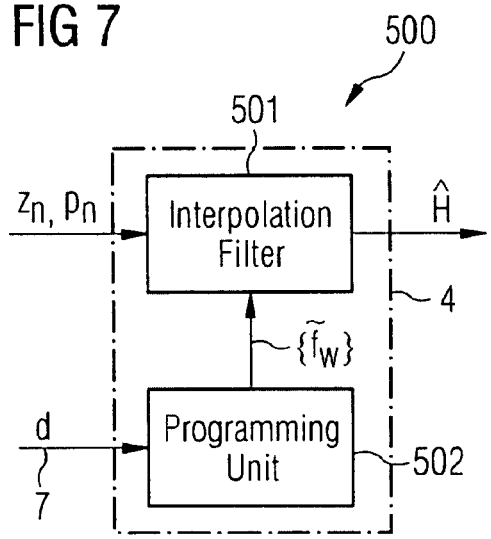
FIG. 7 is a schematic block diagram of an embodiment of a channel estimator.

FIG. 7 is a schematic block diagram of a circuitry 500 forming a channel estimator 4. The circuitry 500 comprises an interpolation filter 501 and a programming unit 502. The interpolation filter 501 is fed by symbols $z_n$ (e.g. pilot symbols $p_n$ which are extracted from the received radio signal samples $z_n$). These symbols $z_n$ are filtered in the interpolation filter 501 using a set of filter coefficients $\{\tilde{f}_w\}$. This set of filter coefficients is provided by the programming unit 502 in response to the control signal 7 expressed by d. The output of the interpolation filter 501 provides the channel estimates (channel parameters) $\hat{H}$.

Let the window size in time of the interpolation filter 501 be $2W+1$, i.e. W preceding and W following symbols are used to calculate the current channel estimate $\hat{H}$. Thus, the set of filter coefficients $\{\tilde{f}_w\}$ used for interpolation can be written as $$\{\tilde{f}_{-W}, \tilde{f}_{-W+1}, \ldots, \tilde{f}_{W-1}, \tilde{f}_W\}. \tag{2}$$

The filter coefficients $\{\tilde{f}_{-W}, \tilde{f}_{-W+1}, \ldots, \tilde{f}_{W-1}, \tilde{f}_W\}$ are calculated such that for the estimation of the channel parameters at the current time instant n all symbols associated with the same discontinuity level as symbol $z_n$ are selected for calculation. To this end, let $Z_n$ be a set of indices m of that symbols $z_{n+m}$ which pertain to the same signal discontinuity level as the current symbol $z_n$, wherein $-W \leq m \leq W$. In addition, $Z_n \subset Y$, with Y being the full set of filter coefficient indices, i.e. $Y=\{-W, -W+1, \ldots, -1, 0, 1, \ldots, W-1, W\}$. Thus, if the current time instant n is defined to be in the center of the time window of length $2W+1$ (which, however, does not necessarily need to be the case), the index 0 is an element of the subset $Z_n$. This subset $Z_n$ contains the indices of the filter coefficients to be used for the interpolation filter 501 at time instant n. The interpolation filter 501 may be of any kind, e.g. it may be an FIR (Finite Impulse Response) filter.

The set of filter coefficients with indices contained in the subset $Z_n$ causes the interpolation filter 501 to process only samples $z_n$ (e.g. pilots) relating to the same signal discontinuity level when calculating the channel estimate $\hat{H}$. Note that, especially in the case of antenna switching, this may be beneficial because symbols received from different antennas have been transmitted via different time varying channels 2 (see FIG. 1) and thus exhibit different channel distortions.

Figure 8:
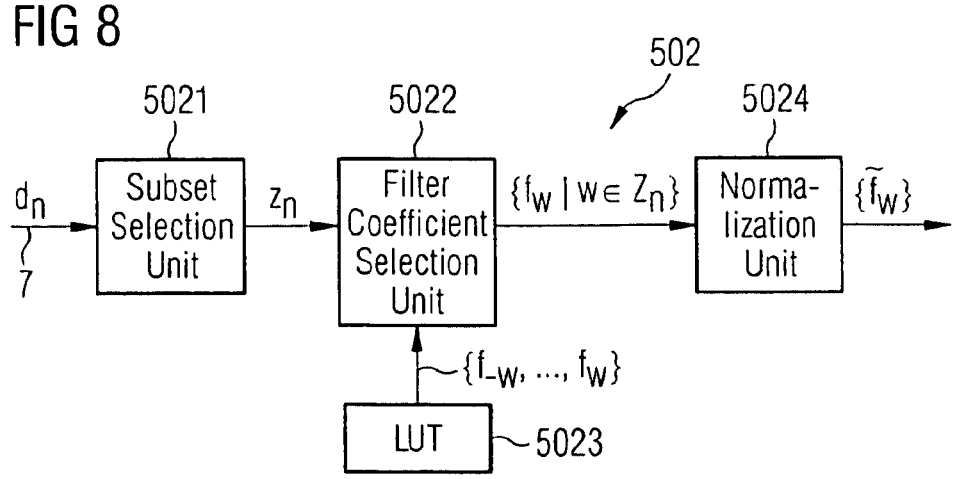
FIG. 8 is a schematic block diagram of a first embodiment of a programming unit shown in FIG. 7.
Figure 9:
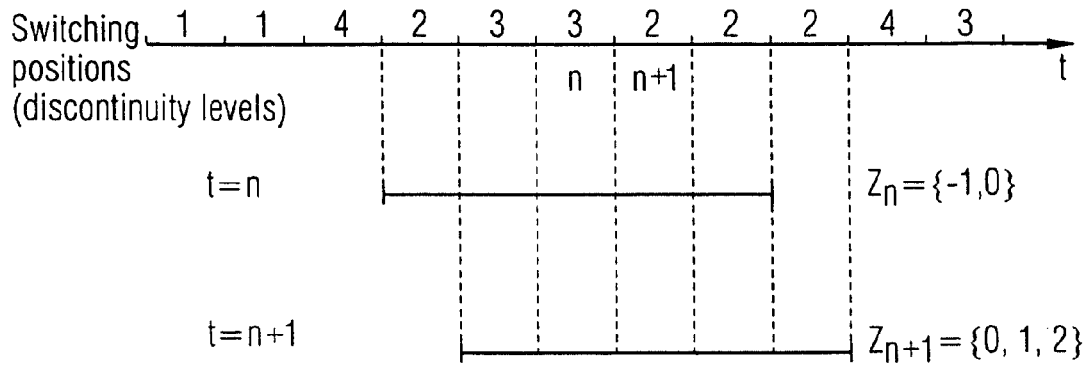
FIG. 9 is a diagram for illustrating the function of a subset selection unit shown in FIG. 8.

FIG. 8 is a schematic block diagram of a first embodiment of the programming unit 502. The programming unit 502 may comprise a subset selection unit 5021, a filter coefficient selection unit 5022, a Look-Up Table LUT 5023 and a normalization unit 5024. The subset selection unit 5021 receives the control signal 7 expressed by $d_n$. If the control signal 7 is coded as shown in FIG. 6, $d_n$ is indicative of the current switching position (or signal discontinuity level) at time instant n. The subset $Z_n$ may then be calculated to comprise all indices m with $d_{m+n}=d_n$. Thus, as illustrated in FIG. 9 for the example $W=2$, $Z_n=\{-1,0\}$, and $Z_{n+1}=\{0,1,2\}$. In practice, W can be larger than 2 and may for instance be in the range between 10 and 20.

These subsets of indices $Z_n$ are communicated at each time instant n to the filter coefficient selection unit 5022. The filter coefficient selection unit 5022 accesses LUT 5023, in which at least one set of filter coefficients of length $2W+1$ is stored. This set of filter coefficients may be a conventional set of filter coefficients which would be used for conventional channel estimation in interpolation filter 501. For instance, this set of filter coefficients may be optimized to provide for a minimum mean square error (MMSE) channel estimation. For example, filter coefficients corresponding to a Wiener filter may provide for MMSE channel estimation. However, filter coefficients for other types of estimators are equally possible. Typically, the one or more sets of filter coefficients stored in LUT 5023 are predetermined (i.e. offline pre-computed) sets of filter coefficients fixedly implemented in the receiver RX. The LUT 5023 may thus be implemented as a ROM (Read Only Memory).

At the output of the filter coefficient selection unit 5022, a subset $\{f_w | w \in Z_n\}$ of filter coefficients associated with the selected indices is output. Since the filter coefficients are normalized with respect to the interpolation window of size 2W+1, i.e. assuming that all 2W+1 filter coefficients are used, the subset of filter coefficients is re-normalized in normalization unit 5024. Let $\{f_w | w \in Y\}$ be the set of filter coefficients as designed for the interpolation window of size 2W+1. Then, the new filter coefficients $\tilde{f}_{\tilde{w}}$ with $\tilde{w} \in Z$ (the index n is omitted for ease of notation) are calculated according to $$\tilde{f}_{\tilde{w}} = \frac{\sum_{w \in Y} f_w}{\sum_{w \in Z} f_w} f_{\tilde{w}}, \tag{3}$$

$$= \frac{f_{\tilde{w}}}{\sum_{w \in Z} f_w}, \tag{4}$$

where the normalization $$\sum_{w \in Y} f_w = 1$$

was used in (3). The filter coefficients $\tilde{f}_{\tilde{w}}$ with $\tilde{w} \notin Z$ are set to zero and may be added to the set of selected and re-normalized filter coefficients in order to expand the set of selected and re-normalized filter coefficients to a number of 2W+1 elements. Applying this re-normalization guarantees that the energy of the filtered signal is preserved. The re-normalizing of the selected filter coefficients may avoid new discontinuities in the signal energy at the output of the equalizer 5. Otherwise, the performance of subsequent data processing units (e.g. a channel decoder following the equalizer 5) could be impacted.

Figure 10:
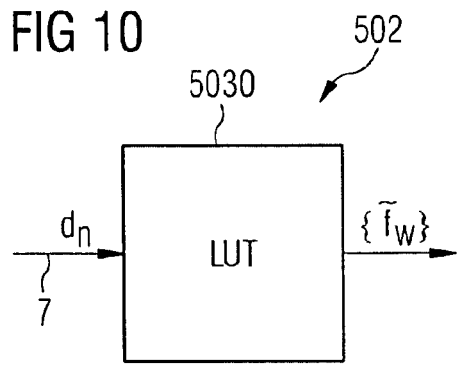
FIG. 10 is a schematic block diagram of a second embodiment of a programming unit shown in FIG. 7.

FIG. 10 displays a circuitry of a second embodiment of the programming unit 502 shown in FIG. 7. In this embodiment, the programming unit 502 comprises a Look-Up Table LUT 5030 in which pre-computed sets of filter coefficients associated with all possible combinations of discontinuity levels over a time span of the window size 2W+1 are stored, i.e. all possible sets of filter coefficients which could be generated by the circuitry shown in FIG. 8. In this case, the indices of the symbols at the same discontinuity level can be used to calculate control signal $d_n$ that directly addresses the entry in the Look-Up Table LUT 5030, where the corresponding re-normalized set of filter coefficients can be found. Thus, each value of $d_n$ (or a correspondingly calculated address) directly addresses an appropriate, pre-computed, re-normalized set of filter coefficients which is adapted to exclude any sample or pilot associated with another signal discontinuity level than the current sample or pilot from effecting the filtering. By way of example, such control signal 7 serving as an address for memory access may be calculated as described above in conjunction with FIG. 11.

The approach to store all possible pre-computed and re-normalized sets of filter coefficients may be of particular interest if the window size 2W+1 of the interpolation window is relatively small, since in this case, the number of possible combinations of filter coefficients with respect to different signal discontinuity levels is not impractically high.

Instead of storing pre-computed sets of filter coefficients derived by filter coefficient selections and re-normalization from conventional sets of filter coefficients as described above, it is further possible that the LUT 5030 stores pre-computed sets of filter coefficients in which the filter coefficients are derived by a pre-computation in which they are individually optimized under the constraints of the different possible combinations of signal discontinuity levels in view of an optimization criterion such as, for example, MMSE. Such pre-optimized sets of filter coefficients $\{\tilde{f}_w\}$ do not simply take into account the signal switching by excluding inappropriate filter coefficients and re-normalizing appropriate filter coefficients as indicated in equations (3) and (4), but may be respectively derived by an optimization under the constraint of one of the possible combinations of signal discontinuity levels within the time span given by the window size 2W+1.

All embodiments described above are in particular applicable for multi-carrier modulation radio communications systems such as e.g. OFDM. OFDM has recently become increasingly popular because it provides a substantial reduction in equalization complexity compared to classical modulation techniques. As already described above, for demodulating OFDM-modulated data in the presence of substantial time variations of the transmission channel, knowledge of the transmission channel frequency response is acquired, and such knowledge is obtained by channel estimation. Pilot-symbol aided channel estimation is based on periodically inserting pilot symbols in the transmitted data sequence. As in OFDM systems channel variations are in two dimensions, pilots are typically inserted in the time-frequency grid. The channel transfer function can then be reconstructed via interpolation by exploiting the correlation of the channel in time and frequency.

In case the transmitter TX shown in FIG. 1 is an OFDM transmitter, the modulator 1 is established by an OFDM modulator 1, which may be implemented by an Inverse Fast Fourier Transform (IFFT) stage. Data symbols $s_{n,k}$ are mapped onto K parallel sub-carriers, where n denotes the symbol time index and k denotes the sub-carrier frequency index running from 1 to K.

The consecutive OFDM symbols are transmitted through the time-variant, frequency-selective and noisy channel 2. Channel parameters are denoted by $H_{n,k}$, i.e. are dependent on time (symbol index n) and frequency (sub-carrier index k).

The OFDM receiver RX has the same configuration as shown in FIG. 1. It comprises an OFDM demodulator 9, which may be implemented as a Fast Fourier Transform (FFT) stage. The OFDM demodulator 9 transforms the received time-domain signal into the frequency domain yielding received sub-carrier samples $z_{n,k}$. Further, the receiver RX comprises an OFDM channel estimator 4 and an OFDM equalizer 5.

The end-to-end OFDM modem transmission model for information data symbols $s_{n,k}$ may be expressed as $$z_{n,k} = H_{n,k} \cdot s_{n,k} + n_{n,k}, \tag{5}$$

where $n_{n,k}$ denotes the thermal noise and other imperfections. In the receiver RX, the received sub-carrier samples $z_{n,k}$ are fed into the OFDM channel estimator 4 and the OFDM equalizer 5. In order to demap the data symbols $s_{n,k}$ in the OFDM equalizer 5, the OFDM channel estimator 4 generates channel estimates $\hat{H}_{n,k}$. From equation (5) it is apparent that estimated data symbols $\hat{s}_{n,k}$ may be directly calculated from the received sub-carrier samples $z_{n,k}$ using the channel estimate $\hat{H}_{n,k}$ relating to the same sub-carrier k and the same symbol n. Thus, no ISI (Inter-Symbol Interference) has to be taken into account according to equation (5). As is known in the art of multi-carrier modulation, this is achieved by the implementation of a guard time period $T_g$ for lengthening the useful OFDM symbol time period $T_u$ to the effective OFDM symbol time period $T_{OFDM}$ according to $T_{OFDM}=T_u+T_g$, wherein $T_g$ is equal or longer in duration than the Channel Impulse Response (CIR) length. As a result, ISI is avoided.

Figure 12:
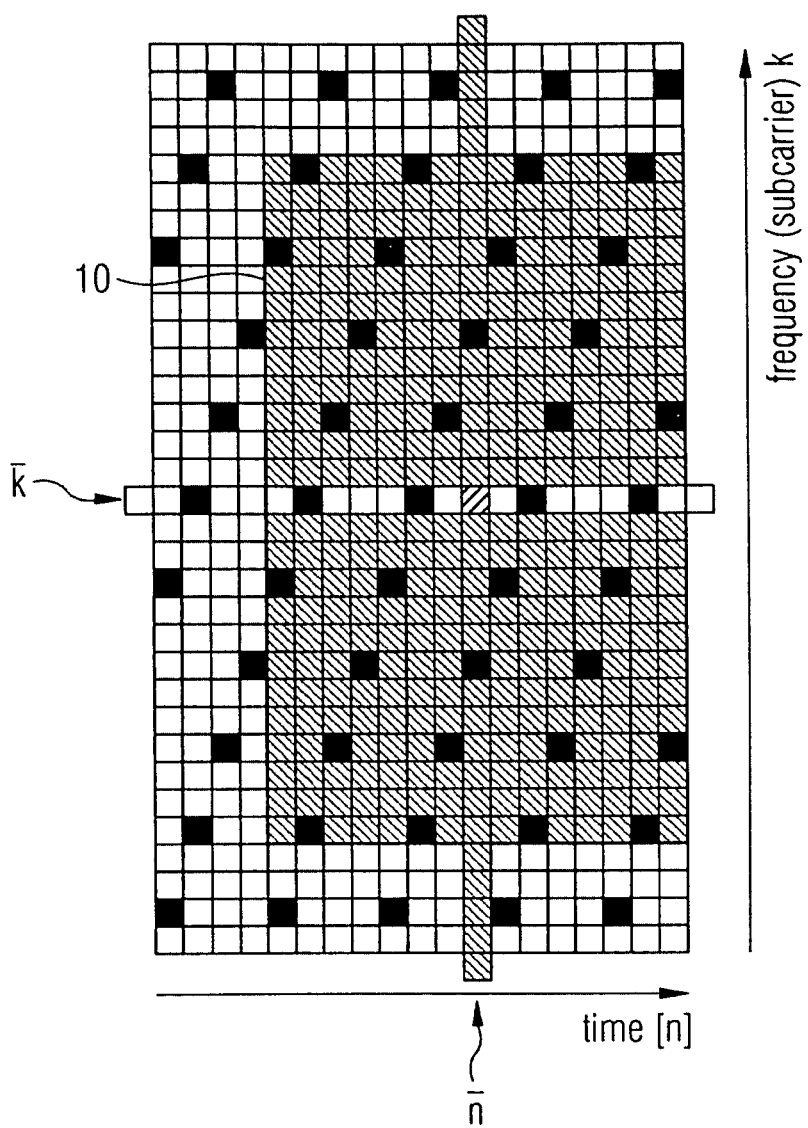
FIG. 12 is an exemplary pilot pattern within the time-frequency grid.

Channel estimation is based on known pilots $z_{n,k}=p_{n,k}$ which are located at known positions (n, k) in the two-dimensional (2D) OFDM time-frequency grid. As an example, the peculiar non-symmetric DVB-T/H pilot pattern in the time-frequency grid is shown in FIG. 12. The frequency (sub-carrier) index k is plotted versus the time (symbol) index n. Pilots $p_{n,k}$ are indicated by filled coordinates squares (n, k).

If the spacing of the pilot symbols $p_{n,k}$ is sufficiently close to satisfy the two-dimensional sampling theorem, channel estimation via interpolation for all coordinates (n, k) is possible. There are at least three basically different approaches for deriving the channel estimates $\hat{H}_{n,k}$.

Figure 13:
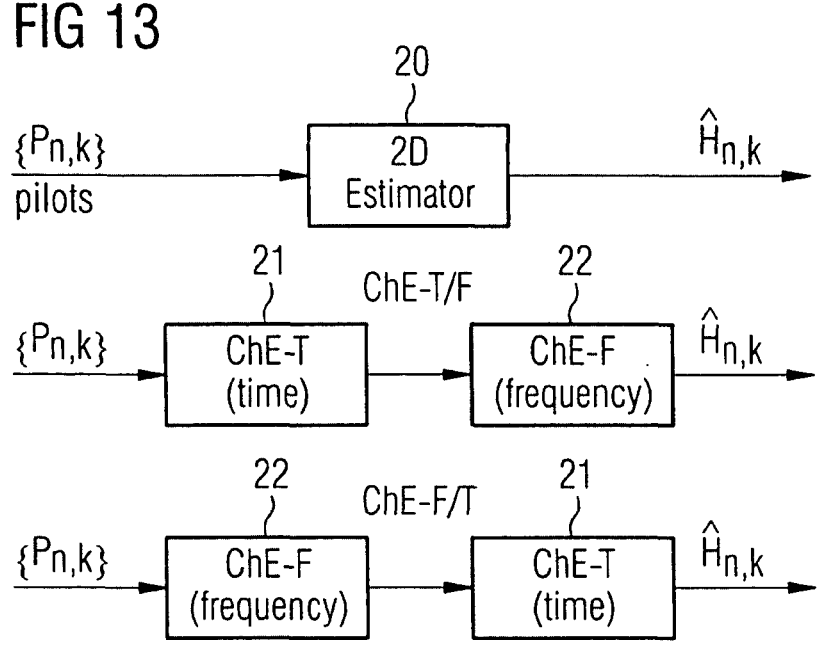
FIG. 13 illustrates three different types of pilot-aided channel estimation techniques used in a multi-carrier radio transmission system.

Assume the channel is to be estimated at hatched coordinate square $(\bar{n}, \bar{k})$. A first possibility depicted in the upper part of FIG. 13 is to use a 2D estimator 20 interpolating the channel at the position $(\bar{n}, \bar{k})$ by using all pilots $p_{n,k}$ inside a finite two-dimensional region 10 (as illustrated in FIG. 12). 2D channel estimation involves a two-dimensional linear FIR (Finite Impulse Response) interpolation filtering of the received pilot samples $p_{n,k}$ within region 10.

Often, 2D channel estimation can be separated into 2×1D channel estimation, which is significantly less complex to implement with respect to optimum 2D channel estimation. 2×1D channel estimation is performed in time direction (ChE-T) and frequency direction (ChE-F), respectively, and may be implemented by a cascade of two linear FIR interpolation filters 21, 22. The case in which time interpolation precedes frequency interpolation is denoted by ChE-T/F and depicted in the middle part of FIG. 13. In this case, time interpolator 21 performs an interpolation in time direction at fixed sub-carrier $\bar{k}$ and frequency interpolator 22 performs an interpolation in frequency direction at fixed time index $\bar{n}$. The alternative case, in which frequency interpolation precedes time interpolation, is denoted by ChE-F/T and is shown in the lower part of FIG. 13. In this case, the frequency interpolator 22 precedes the time interpolator 21.

In 2D channel estimation as well as in 2×1D channel estimation, the FIR filter coefficients are typically optimized in the MMSE (minimum mean square error) sense. It is known that a 2D Wiener filter or two 1D Wiener filter provide for optimum MMSE performance. The filter coefficients depend on the pilot and data positions (n, k). Therefore, the 2D estimator 20 requires for each coordinate in the region 10 an individual 2D FIR filter, i.e. an individual set of 2D filter coefficients. Each such pre-computed individual set of 2D filter coefficients may be stored in LUT 5023 shown in FIG. 8. Each of these sets of 2D filter coefficients may be processed as shown in FIG. 8 (by filter coefficient selection and re-normalization) to generate a set of filter coefficient associated with the pilot and data positions (n, k) and taking into account signal switching events.

In the ChE-T/F case, the time interpolator 21 has 4 different filters (i.e. 4 sets of filter coefficients) and the frequency interpolator 22 has 3 different filters (i.e. 3 sets of filter coefficients), because the pilot spacings in the time-frequency directions are (4,3). In the case of ChE-F/T, the frequency interpolator 22 has 12 different filters (i.e. 12 sets of filter coefficients) and the time interpolator 21 has 1 filter (i.e. 1 set of filter coefficients), because the pilot spacings in the frequency-time directions are (12, 1). Thus, in the ChE-T/F case, 4 sets of filter coefficients may be stored in LUT 5023 for the time interpolator ChE-T 21, and in the case of ChE-F/T, one set of filter coefficients may be stored in LUT 5023 for the time interpolator ChE-T 21. Again, these sets of filter coefficients may be processed as shown in FIG. 8 (by filter coefficient selection and re-normalization).

Alternatively, when the programming unit 502 in an OFDM receiver RX is designed as an LUT 5030 as shown in FIG. 10, all pre-computed sets of filter coefficients depending on (n, k) and $d_n$ are stored in LUT 5030. As already described, the LUT 5030 may be directly addressed by signal $d_n$ as coded according to FIG. 11 in combination with an information relating to the filter to be selected depending on the actual pilot and data positions (n, k).

In addition, while a particular feature or aspect of an embodiment of the invention may have been disclosed with respect to only one of several implementations, such feature or aspect may be combined with one or more other features or aspects of the other implementations as may be desired and advantageous for any given or particular application. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A radio receiver comprising: a processing unit configured to subject a received radio signal to antenna switching, wherein the processing unit comprises a selector switch configured to selectively switch between a plurality of antennas, and wherein the processing unit is configured to output an antenna-switched digital radio signal based on an output of the selector switch, a control unit configured to output a control signal indicative of antenna switching between said plurality of antennas, and a channel estimator coupled to an output of the processing unit, wherein the channel estimator is configured to provide adjusted channel parameters based on the antenna-switched digital radio signal and on the control signal received at the channel estimator from the control unit.

2. The radio receiver of claim 1, wherein
the channel estimator comprises a programmable interpolation filter.

3. The radio receiver of claim 2, further comprising:
a programming unit configured to provide a set of filter coefficients to the programmable interpolation filter, wherein the set of filter coefficients is based on the control signal.

4. The radio receiver of claim 3, wherein the programming unit comprises:
a selection unit configured to select a subset of filter coefficients from a predetermined set of filter coefficients in response to the control signal.

5. The radio receiver of claim 4, wherein the programming unit further comprises:
a normalization unit configured to re-normalize filter coefficients contained in the selected subset of filter coefficients.

6. The radio receiver of claim 3, wherein the programming unit comprises:
a look-up table configured to store a plurality of sets of filter coefficients, wherein the look-up table is configured to provide the set of filter coefficients responsive to the control signal.

7. The radio receiver of claim 1, wherein
the control unit is configured to output the control signal having a plurality of possible values, wherein each possible value of the control signal is indicative of one specific switching level of the switched received radio signal.

8. The radio receiver of claim 1, wherein
the control unit is configured to output the control signal having a plurality of possible values, wherein each possible value of the control signal is a vector indicative of samples of the switched received radio signal corresponding to a same switching level.

9. The radio receiver of claim 1, further comprising:
multiple antennas included in the processing unit, and wherein
the processing unit comprises a selector switch used for signal switching to select one or more specific antenna signals to be coupled to the output of the processing unit.

10. The radio receiver of claim 1, further comprising:
an equalizer coupled to the output of the processing unit and configured to equalize the switched received radio signal based on the channel parameters.

11. The radio receiver of claim 1, wherein the processing unit further comprises
a multi-carrier demodulator.

12. A method for channel estimation in a radio communications system, comprising:
subjecting a received radio signal to antenna switching, wherein a processing unit comprises a selector switch configured to selectively switch between a plurality of antennas, and outputting an antenna-switched digital radio signal based on an output of the selector switch;
generating a control signal indicative of antenna switching between said plurality of antennas; and
estimating channel parameters to provide adjusted channel parameters based on the antenna-switched digital radio signal and on the control signal received at the channel estimator from a control unit.

13. The method of claim 12, wherein estimating channel parameters comprises:
filtering the switched received radio signal by a programmable interpolation filter.

14. The method of claim 13, further comprising:
providing a set of filter coefficients, wherein the set of filter coefficients is based on the control signal; and
programming the programmable interpolation filter.

15. The method of claim 14, further comprising:
selecting a subset of filter coefficients from a predetermined set of filter coefficients based on the control signal.

16. The method of claim 15, further comprising:
re-normalizing filter coefficients contained in the selected subset of filter coefficients.

17. The method of claim 14, wherein providing a set of filter coefficients comprises:
addressing a look-up table configured to store a plurality of sets of filter coefficients.

18. The method of claim 12, wherein the control signal is generated to have a plurality of possible values, wherein each possible value is indicative of one specific switching level of the switched received radio signal.

19. The method of claim 12, wherein the control signal is generated to have a plurality of possible values, wherein each possible value of the control signal is a vector indicative of samples of the switched received radio signal corresponding to a same switching level.

20. The method of claim 12, further comprising:
providing a plurality of antenna signals; and
performing signal switching by operating a selector switch to select a specific antenna signal as the received radio signal.

21. The method of claim 12, further comprising:
equalizing the switched received radio signal responsive to estimated channel parameters.

22. The method of claim 21, further comprising:
multi-carrier demodulating the switched received radio signal prior to equalization.

23. A multi-carrier radio receiver comprising:
a receiver input unit comprising an antenna switch for switching between multiple antennas,
a multi-carrier demodulator coupled to an output of the receiver input unit,
a channel estimator coupled to an output of the multi-carrier demodulator and operable to compute channel parameters indicative of a channel transfer function, and
an equalizer coupled to an output of the multi-carrier demodulator and to an output of the channel estimator, and operable to equalize a signal received from the output of the multi-carrier demodulator in response to the channel parameters, wherein
the receiver input unit is configured to output a control signal indicative of antenna switching between said multiple antennas using the antenna switch, and
the channel estimator is configured to compute the channel parameters to provide adjusted channel parameters based on the signal received from the output of the multi-carrier demodulator and on the control signal received at the channel estimator.

24. A radio receiver comprising: a processing unit configured to subject a received radio signal to antenna switching, wherein the processing unit comprises a selector switch configured to selectively switch between a plurality of antennas, and wherein the processing unit is configured to output an antenna-switched digital radio signal based on an output of the selector switch,
a control unit configured to output a control signal indicative of antenna switching between said plurality of antennas, and
a channel estimator coupled to an output of the processing unit, wherein the channel estimator comprises a programmable interpolation filter, and wherein the channel estimator is configured to provide adjusted channel parameters based on the control signal received from the control unit; and
a programming unit configured to provide a set of filter coefficients to the programmable interpolation filter, wherein the set of filter coefficients is based on the control signal, wherein the programming unit comprises a selection unit configured to select a subset of filter coefficients from a predetermined set of filter coefficients in response to the control signal.

25. A radio receiver comprising: a processing unit configured to subject a received radio signal to antenna switching, wherein the processing unit comprises a selector switch configured to selectively switch between a plurality of antennas, and wherein the processing unit is configured to output an antenna-switched digital radio signal based on an output of the selector switch,
a control unit configured to output a control signal indicative of antenna switching between said plurality of antennas, and
a channel estimator coupled to an output of the processing unit, wherein the channel estimator comprises a programmable interpolation filter, and wherein the channel estimator is configured to provide adjusted channel parameters based on the control signal received from the control unit; and a programming unit configured to provide a set of filter coefficients to the programmable interpolation filter, wherein the set of filter coefficients is based on the control signal, wherein the programming unit comprises a look-up table configured to store a plurality of sets of filter coefficients, wherein the look-up table is configured to provide the set of filter coefficients responsive to the control signal.

* * * * *